United States Patent [19]

Banks et al.

[11] Patent Number: 4,873,098

[45] Date of Patent: Oct. 10, 1989

[54] METHOD FOR CONTROLLING THE SPREAD OF SOFT COOKIES

[75] Inventors: Lori Banks, Lincoln Park; Grant C. Busk, Jr., Chester; Bin Chiang, Cedar Knolls; Robert Thulin, Wyckoff, all of N.J.

[73] Assignee: Nabisco Brands, Inc., East Hanover, N.J.

[21] Appl. No.: 108,466

[22] Filed: Oct. 15, 1987

[51] Int. Cl.$^4$ ............................................. A21D 13/08
[52] U.S. Cl. ....................................... 426/94; 426/549; 426/551
[58] Field of Search .................. 426/94, 549, 551, 578

[56] References Cited

U.S. PATENT DOCUMENTS

| | | | |
|---|---|---|---|
| 3,966,990 | 6/1976 | Cremer et al. | 426/549 |
| 4,157,406 | 6/1979 | Hanamoto et al. | 426/622 |
| 4,259,362 | 3/1981 | Hanamoto et al. | 426/518 |
| 4,374,862 | 3/1981 | Hong et al. | 426/94 |
| 4,444,799 | 4/1984 | Vanderveer et al. | 426/549 |
| 4,455,333 | 6/1984 | Hong et al. | 426/94 |
| 4,465,702 | 8/1984 | Eastman et al. | 426/578 |
| 4,503,080 | 3/1985 | Brabbs et al. | 426/94 |
| 4,584,203 | 4/1986 | Du Vall et al. | 426/94 |
| 4,624,856 | 11/1986 | Vanderveer et al. | 426/549 |
| 4,664,921 | 4/1985 | Seiden | 426/94 |
| 4,668,519 | 5/1987 | Dartey et al. | 426/553 |
| 4,668,522 | 5/1987 | Cappel et al. | 426/94 |
| 4,689,236 | 8/1987 | Pinto | 426/94 |
| 4,717,570 | 10/1985 | Polizzano | 426/94 |
| 4,717,577 | 1/1988 | Constance et al. | 426/549 |
| 4,772,849 | 10/1985 | Dartey et al. | 426/94 |

OTHER PUBLICATIONS

Yamazaki, W. T., "Laboratory Testing of Flours and Cookie Quality Research", Cereal Science Today, vol. 7, No. 4, pp. 98, 100, 102–104, 125.

Matz, S. A. et al., Cookie and Cracker Technology, 2nd Ed., AVI Publishing Co., Inc. Westport, CT, (1968) pp. 151, 12, 120–121.

Finney et al., Cereal Chem. 27, 30–41 (1950).

Brenneis, L. S., "Qualitative Factors in the Evaluation of Cookie Flavours", The Baker's Digest, vol. 39, No. 1, pp. 66–69 (1965).

Primary Examiner—Donald E. Czaja
Assistant Examiner—Mary S. Mims
Attorney, Agent, or Firm—Richard Kornutik

[57] ABSTRACT

Oven spread is controlled in the production of soft cookies which comprise unbleached flour by using a cold water swelling granular starch material having a cold water solubility of least 50%. The doughs of the present invention may be used in the production of single dough soft cookies or in the production of multi-textured cookies having extended shelf lives. The granular starch material reduces cookie spread and unexpectedly provides a shelf-stable, more moist and tender texture in cookies which contain high humectant levels without loss of machinability of the dough.

21 Claims, No Drawings

METHOD FOR CONTROLLING THE SPREAD OF SOFT COOKIES

FIELD OF THE INVENTION

This invention relates to a method for controlling the spread of soft cookies made with unbleached flour. This invention also relates to soft cookies having an enhanced tender texture and an extended shelf life and to dough compositions and methods for producing the cookies. The soft cookies of the present invention include multitextured cookies.

BACKGROUND OF THE INVENTION

Soft cookies generally have a water content of at least about 6% by weight of the cookie. As the moisture content, or aqueous liquid humectant content of a cookie dough is increased to provide a higher moisture content in a cookie: (a) cookie spread tends to increase, (b) the dough tends to lose viscosity and machinability, and (c) longer baking times at a given baking temperature are generally needed to develop color. As used herein cookie spread is defined as the horizontal movement in the dough mass as it is subjected to oven baking conditions. Generally the greater the amount of moisture present in the dough piece as it bakes the greater the horizontal movement in the dough piece. According to Matz, S. A. et al., *Cookie and Cracker Technology*, 2nd Ed., AVI Publishing Co., Inc., Westport, CT, pg. 151 (1978), the control of cookie spread is one of the most serious problems confronting the production man. Minor variations in appearance, flavor, and texture are usually accepted with little complaint, but a cookie which spreads so much that it cannot be filled in the package, or one that spreads too little, causing slack fill or excess height for the package, can create havoc on the packaging line and generate large amounts of scrap.

Cookie size is commonly controlled in commercial practice by altering the amount of water in the dough formula correlated with changes in oven baking conditions, see Matz, supra, at page 153, wherein availability of free water in the dough is described as the most important factor in controlling cookie spread during baking.

According to Matz, S. A., *Cookie and Cracker Technology*, The AVI Publishing Company, Inc., Westport, Conn., page 12, (1968), increasing the intensity of chlorine treatment of a soft wheat flour reduces the diameter and increases the thickness of test bake cookies made from the flour. It is reported that the diameter of a cookie made with an unbleached flour of pH 5.88 had a diameter of 818 mm whereas the diameter of a cookie made with flour bleached to a pH of 4.87 was only 706 mm.

However, the use of bleached flour in a commercial bakery is undesirable for a number of reasons. First, bleached or brominated flour is normally bleached with chlorine or bromine gas. As stated in U.S. Pat. Nos. 4,157,406 and 4,259,362 both issued to Hanamoto, et. al., the bleaching of flour has become suspect and it is desirable to avoid such treatments and chemicals additives wherever possible. According to these patents foreign countries prohibit the use of bleached flours in their baked products. As a result, these countries do not import American products which contain bleached flour. Therefore the use of bleached flour is undesirable both from health and marketing aspects.

Another problem in using bleached flour in a large commercial bakery is that it is seldom used in other cookie products. Therefore, separate handling and storage facilities must be set up and maintained to handle a proportionately small amount of the overall flour requirements which undesirably increases per unit production costs.

Furthermore, Matz (1968), supra, at pages 120–121, teaches that chlorine bleached flours are not recommended for soft type cookies where relatively large amounts of tenderizing and moisture-retaining ingredients such as sugar, shortening, and egg yolk are used. According to Matz, if the flour is decreased too much, as when large amounts of enriching ingredients are added, the cookie will lack body and may become too fragile.

In the production of wire-cut soft cookies, Matz reports at page 127, it is recommended to use a medium strong soft red winter wheat flour, lightly bleached with chlorine, with an ash content of about 0.39% and a protein content of about 9.5%, or a strong soft red winter wheat, unbleached, having an ash of about 0.41% and a protein content of about 9.5%. It is further disclosed that the sugar should be predominantly granulated with perhaps 18 to 24% invert, and that eggs should be present at the 14% level, each on a flour weight basis. However, these formulas require a red winter wheat flour with a relatively high protein content, a large amount of eggs, and a narrow range for the invert sugar content.

U.S. Pat. No. 4,668,522 to Cappel et al. discloses controlling the size and texture of cookies which have storage-stable texture variability through the use of a specific mixing procedure. According to the patent, adding the required total amount and type of sugar in varying proportions at different points in the dough mixing sequence permits control of the size and texture of the cookie.

According to Cappel et al., it is known that cookie size is affected by the distribution of water between the starch. Hydrophilic flour or other hydrophilic components which impede sugar dissolution, it is disclosed, decrease cookie size. Increasing the sugar content in the cookie dough reduces migration of water towards the hydrophilic starch in the hotter outer zones of the cookie. This reduction in migration, according to Cappel et al., causes a less viscous interior and greater lateral expansion. See also, Yamazaki, W. T., "Laboratory Testing of Flours and Cookie Quality Research", Cereal Science Today, Vol. 7, No. 4, pp. 98, 100, 102–104, 125, April 1962; and Brenneis, L. S., "Qualitative Factors in the Evaluation of Cookie Flavours", *The Baker's Digest*, Vol. 39, No. 1, pp. 66–69 (1965). However, control of cookie spread in soft cookies containing unbleached flour is not taught.

U.S. Pat. Nos. 4,444,799 and 4,624,856 each to Vanderveer et al. teach a method and composition for producing soft cookies having an extended shelf life by the use of edible firm humectant gels. The gels contain an edible gum capable of being set by calcium ions. The gel is capable of being ground and is incorporated into the dough to produce a product which will retain its fresh baked, moist, tender texture for an extended period of time. In Example 2 of each patent, soft cookies are made with a bread type wheat flour. Controlling spread in soft cookies which contain unbleached flour is not disclosed.

According to each of the two above-mentioned Hanamoto et al. patents, bleaching wheat flour improves the texture, grain, volume, and eating quality of cakes produced from the flour. The color of white cake, it is taught, is also improved when bleached flour is incorporated into the cake mix. The Hanamoto et al. patents teach that the baking properties of wheat flour itself can be improved without use of chlorine or other chemical agents by heating raw, non-dehydrated soft wheat flour at a temperature of 49° to 93° C. for a period of 1 hour to ten weeks. The so-treated flour exhibits improved baking properties and may be used to prepare high-sugar baked goods, such as cakes and the like, according to the patents.

Improved properties may also be obtained, it is taught, by treating starch to obtain limited swelling thereof. The starch is mixed with excess water and held at a temperature of 54° to 71° C. for a period of time great enough to swell the starch granules but not so great as to cause fragmentation thereof.

The heat-treated flour and the swelled starch may be used in combination to prepare cakes which, according to the patents, exhibit properties substantially more improved than those obtained when the products of each treatment is employed separately and more improved than those produced from bleached flour.

The present invention provides a method for controlling oven spread of soft cookies having unbleached flour and high humectant contents so as to obtain a consistently sized product on a continuous, mass production basis. The soft cookies of the present invention have an unexpectedly moist and tender texture for extended periods of time.

SUMMARY OF THE INVENTION

The present invention provides a method for controlling the oven spread in the continuous, mass-production of soft cookies made with unbleached flour. A cold water swelling granular starch material having a cold water solubility of at least 50% is included in a cookie dough in an amount of from about 2% by weight to about 20% by weight, preferably from about 4% by weight to about 12% by weight, based upon the weight of the unbleached flour. The starch reduces cookie spread, and unexpectedly provides a shelf-stable, more moist and tender texture in cookies which contain high humectant levels without loss of machinability of the dough. The doughs of the present invention may be used in the production of single dough soft cookies or in multi-textured cookies.

DETAILED DESCRIPTION OF THE INVENTION

The attainment of a consistent cookie size, in terms of diameter and height is essential to the continuous mass production of cookies which are packaged in trays. The tray, containing the cookies is placed within a bag-type package which is then sealed. The tray serves to protect cookie integrity and to reduce soft cookie deformation during packaging and transport. However, the cookies must be of a size which fits consistently within the tray's dimensions.

In the present invention a cold water soluble granular starch material is used in soft cookies having an unbleached flour and a high humectant level to reduce the spread of the soft cookies. The spread is controlled so that it is substantially the same as the spread which would be obtained with the same amount of a bleached flour. The soft cookies of the present invention have an unexpectedly more tender and moist texture which lasts for extended periods of time, typically for at least about two months, preferably for at leas about 6 to 12 months when the cookie is stored in a closed container or package. The soft cookies of the present invention have a moisture content of at least 6%, and preferably a moisture content of from about 7% to about 10% by weight.

The flour employed in the present invention is selected from conventional ingredient lines. The flour component may be wheat flour alone or in combination with any comminuted cereal grain or edible seed meal such as wheat flour, peanut flour, rye flour, corn flour, rice flour, potato flour, barley flour, or the like, and mixtures thereof. Wheat flour is preferred. An "unbleached flour" is one which has not been subjected to bleaching by oxidizing chemicals or bleaching agents such as by either bromination or chlorination. Bleaching of flour lowers its pH. Typically an unbleached flour for use in cookie production has a pH of about 6.5 to about 6.8. Air oxidation may lower the pH of the unbleached flour. Bleached flours for use in cookie production typically have a pH of about 4.5 to about 5.5. Medium to lightly bleached flours typically have a pH in the range of about 5.6 to about 6.4.

In practicing this invention, it is preferred that only unbleached flours be used, although the invention is not limited to flour mixtures or cookies containing only unbleached flour. Bleached flours or other chemically modified flours may be used in combination with unbleached flour in the cookies of the present invention. The flour or flour mixture preferably has a pH of about 6.5 to about 6.8, but it may be lower, such as about 6.0.

In the production of the soft cookies of the present invention, the amount of flour used is typically from about 25% by weight to about 50% by weight, based upon the weight of the dough, exclusive of inclusions such as flavor chips, fruit pieces, nuts, and the like. Substantially all or all of these flour amounts is preferably unbleached in the cookie doughs of the present invention which are bakeable to a soft, moist tender texture.

The protein content of the wheat flour used in the soft, moist cookies of the present invention may range from 7% to about 12%, typically from about 8% to about 9.5%, based upon the weight of the flour. Generally, the lower the protein content of the unbleached flour, the more tender is the cookie.

The cold water soluble granular starch material for use in the present invention should, upon hydration at ambient temperature, form a gel-like structure which is further characterized by its ability to retain moisture. The starch should also possess high thermal stability so that after the starch has set, the gel substantially maintains its viscosity when it is then subjected to cookie baking conditions in a dough matrix. A preferred starch will maintain its increased viscosity for a sufficient time period such that the spread of the dough is retarded during the baking period.

Furthermore, the cold water soluble granular starch materials should have a cold water solubility of at least 50% and preferably at least 70%. Cold water solubility as used in characterizing the present cold-water-swelling starch material is determined by mixing a known weight of starch in a measured volume of distilled water at ambient temperature with a Waring blender, centrifuging the starch suspension and weighing the residue obtained by evaporation of a measured aliquot of the supernatant liquid. The water solubility of the starch sample is expressed as % water solubles, dry substance basis (dsb). A specific procedure for measuring cold water solubility of starch samples is described in U.S. Pat. No. 4,465,702 to Eastman et al. (assigned to A. E. Staley Manufacturing Company) at col. 11, line 49 to col. 12, line 20. This procedure is herein incorporated by reference.

Starches from different sources such as potato, corn, tapioca and rice may be used and they may have been subjected to either physical and/or chemical modification. It is also contemplated that one particular food starch or mixtures of food starches may be used. A preferred group of starches for use in the soft cookie composition are those prepared from corn.

The production of cold water soluble granular starch materials which may be used in the practice of the invention is described in the above-mentioned U.S. Pat. No. 4,465,702 to Eastman et al., which patent is herein incorporated by reference in its entirety. According to U.S. Pat. No. 4,465,702, the cold-water swelling/cold-water soluble starch materials are prepared by forming a slurry of granular ungelatinized corn starch in a liquid medium comprised of water and either ethanol, denatured ethanol, propanol or isopropanol, heating the slurry to a temperature of about 300° F. to about 360° F. at or above autogenic pressure for about 1 to about 30 minutes. The cold-water-swelling granular starch material is then separated from the processing medium by filtration, centrifugation, decantation and like means.

According to the patent, the cold-water swelling-/cold-water soluble starch materials derived from ungelatinized corn starch consist essentially of substantially intact, partially swollen granules which appear nonbirefringent when viewed under a polarizing microscope and which have a cold water solubility of at least 50% and a reduced native fat content of about 0.25% or less. The ungelatinized corn starch starting material can be either chemically unmodified, i.e. not reacted with chemical modifiers, or modified chemically by reaction with various amounts of starch reactive chemical reagents such as oxidants, acids, etherifying agents and esterifying agents. The cold-gelling characteristic (i.e. the ability to set to a sliceable gel) of the granular starch materials, it is disclosed, is most prominent where the granular starch starting material has been subjected to little or no chemical modification.

A cold water swelling, granular starch for use in the present invention which is commercially available is sold under the name "MIRA-GEL TM 463 Starch" and is manufactured by the A. E. Staley Manufacturing Company, Decatur, Ill. This starch is derived from corn starch. Unlike a typical pregelatinized starch which microscopically reveals particles that are swollen, fragmented and generally flake-like in shape, MIRA-GEL TM 463 particles appear as whole, regular granules. It thickens and sets to a gel quickly using room temperature water. Setting of the gel typically occurs in half an hour at room temperatures and the gel strength exceeds that of conventional, cooked, common corn starches. The 463 starch has the ability to gelatinize and set in a low moisture media such as corn syrup (20% moisture) with no more than atmospheric cooking (less than or equal to 212° F.). Gels made with the starch will not melt or flow when exposed to high heat. They are heat stable, retaining form and firmness, even when held at oven temperatures of 350° F. Typically, the 463 starch is a white powder having a moisture content of about 5%, a pH of about 5.5, an ash content of about 0.1%, a gel strength of at least 90 grams as measured on a Voland Stevens LFRA Texture Analyzer, and a cold water solubles content of at least 70% by weight. A typical screen analysis for the product is: (a) 0.1% t maximum on a U.S. #30 mesh, and (b) 95.0% minimum through a U.S. #100 mesh.

The amount of cold water soluble granular starch material used in making up the soft cookie dough will depend on a number of factors, including but not limited to, the amount and type of flour used, the amount of moisture present in the dough, the amount and type of humectant present in the dough, and the particular starch material. The amount of the starch material used should be sufficient to reduce the spread of the cookie so that it is substantially equal to the spread which would be obtained if: (a) all of the flour was bleached to a pH of about 4.5 to about 5.5 and (b) the cold water swelling granular starch material was not used.

The soft cookie doughs of the present invention typically contain from about 0.5% to about 10%, more typically from about 1% to about 6% by weight of a cold water swelling granular starch material, based upon the weight of the dough, exclusive of inclusions. For a given dough, the amount of cold water swelling granular starch material should be from about 2% by weight to about 20% by weight, preferably from about 4% by weight to about 12% by weight, based upon the weight of the unbleached flour in the dough.

Generally, the higher the moisture content of a given dough, the higher should be the amount of the cold water swelling granular starch material which is used in the dough. The amount of water should be sufficient to provide the desired high moisture content in the cookie without adversely affecting dough machinability in terms of stickiness, excessive softness or loss of viscosity, or extrudability. For example, a dough which contains so much water that its viscosity is reduced to the point where flavor chips or other inclusions tend to drag behind the dough upon extrusion would be an unacceptable dough for mass production. The inclusions will eventually clog up the extruder. Additionally, excessively high moisture contents in the dough would require prolonged baking times to achieve a particular final cookie moisture content. Use of the cold water swelling granular starch materials in the soft cookies of the present invention tends to reduce dough machinability problems in high moisture content and high humectant content doughs. In addition, the starch materials promote an unexpectedly more tender, moist textured crumb structure in the soft cookies which last for periods of two months or more.

The initial moisture content of each dough is adjusted to provide the desired consistency to the dough to enable proper mixing, working and shaping of each single dough and coextruded doughs. The total moisture content of each dough will include any water included as a separately added ingredient, as well as the moisture provided by flour (which usually contains about 12% to about 14% by weight moisture), and the moisture provided by dough additives included in the formulation, such as high fructose corn syrup, invert syrups, or other liquid humectants. Taking into account all sources of moisture in the dough, including separately added water, the total initial moisture content of each dough is generally from about 10% by weight to about 25% by weight of the dough formulation, exclusive of particulate inclusions such as nuts, raisins, chocolate chips, and the like.

In the production of coextruded cookies, the initial moisture content of the filler or inner cookie dough may generally be at least about 15% by weight more than the initial moisture content of the casing or outer cookie dough. The higher moisture content of the filler dough facilitates attainment of a higher water content in the inner portion of the cookie than in the outer portion, at the same shelf-stable water activity.

The humectant used in the soft cookies of the present invention should absorb and bind or hold water so as to impart a shelf-stable softness to the cookies. The binding should be such that the equilibrium rate of moisture loss from the baked product to the environment due to the presence of the humectant is slowed to such a degree that a baked product containing the humectant, and having an initial moisture content of at least about 6% by weight, exclusive of inclusions retains a moist, soft and tender texture for at least about two months, and preferably for at least about 6–12 months when the cookie is stored in a closed package.

In the production of multitextured cookies, the humectant used in the inner portion of the cookies the binding should be such that the baked product having an initial moisture content of at least about 6% by weight, exclusive of inclusions: (1) retains a soft and pliable texture in the portion baked from the filler dough, (2) retains a firmer and tender texture in the portion baked from the casing dough, and (3) the retention of the multiple texture is for at least about two months, and preferable for at least about 6–12 months when the cookie is stored in a closed container.

Humectant sugars may be employed alone or in combination with other sugars in the doughs to impart a soft texture to the cookies. Suitable humectant sugars include fructose, lactose, dextrose, maltose, galactose, sorbose, mannose, maple syrup, corn syrups, invert syrups, high fructose corn syrups, honey, molasses, as well as mixtures of one or more of the foregoing humectants. For example, a suitable humectant sugar composition may comprise about 0 to 85 percent sucrose, with the balance of the sugar being comprised of fructose employed in the form of crystallized sugar. Alternatively, the balance of the sugar may be provided by the sugar solids content of a corn syrup, honey or a high fructose corn syrup, or another humectant sugar.

Commercially available high fructose corn syrups are preferred humectants. They are low in cost, are highly humectant, provide a pleasant sweet taste, and are readily commercially available. They are prepared by the enzymatic isomerization of dextrose containing corn syrups, and typically possess a sugar solids component of about 40 percent to about 100 percent by weight fructose, with the balance of the non-fructose sugar solids being primarily dextrose plus minor amounts of other monosaccharides. The sugar solids content of commercially available high fructose corn syrups typically ranges from about 70 percent to about 73 percent, up to about 82 percent by weight. High fructose corn syrups having at least about 80% by weight of their solids as fructose are most preferred because of the high water-holding capacity of fructose compared to the capacities of other sugars at microbially shelf-stable water activities (i.e. less than about 0.7).

In addition to the humectant sugars, humectants, or aqueous solutions of humectants which are not sugars or possess a low degree of sweetness relative to sucrose may also be employed in the cookie doughs. For example, the use of glycerol, sugar alcohols such as mannitol, maltitol, xylitol and sorbitol, and other polyols, as humectants is well known in the art. Additional examples of humectant polyols (i.e. polyhydric alcohols) include humectant glycols, for example propylene glycol and hydrogenated glucose syrups. Other humectants include sugar esters, dextrins, hydrogenated starch hydrolysates, and other starch hydrolysis products. However, the humectant sugars are preferred because of their sweetness.

Edible humectant gels such as a humectant sucrose gel and/or a high fructose corn syrup gel can be used in the cookie doughs for achieving a soft texture. However, such humectant gels are preferably employed in combination with one of the other humectant materials mentioned above. Preparation of the gels and of doughs containing them for producing soft edible baked products is taught in U.S. Pat. Nos. 4,444,799 and 4,624,856 each to Vanderveer et al. and commonly assigned. Each patent is incorporated herein by reference in its entirety.

Sucrose may suitably be used in the single dough cookies in an amount of less than 85% by weight, preferably less than 75% by weight, based upon the total sugar solids content of the dough. Brown sugar may be used as a source of the sucrose as well as a source of fructose and dextrose.

In the production of multi-textured soft cookies, sucrose may suitably be employed in each of the casing dough and the filler dough in an amount of less than 75% by weight, based upon the total sugar solids content of each dough. Other sugars, such as lactose and/or dextrose or other low water-holding capacity sugars, may be used in a total amount greater than 25% by weight, typically from about 30% to about 40% by weight, up to about 60% by weight of the total weight of sugars in the outer or casing dough which is bakeable to a firmer texture than is the inner or filler dough.

In the doughs of the present invention, on the basis of 100 pounds of the flour component of each dough, the humectant plus any sucrose of other sweetener employed (e.g. artificial sweeteners) in the formulation may be present in amounts ranging from about 25 to about 150 pounds depending on the degree of sweetness and humectant properties desired in the baked product.

The total sugar solids content (exclusive of inclusions) of each dough may be from about 25 pounds to about 150 pounds, typically from about 50 to about 110 pounds, per 100 pounds of the flour component of each dough. In the production of multi-textured cookies, the total sugar solids content of the filler dough may be at least 20% more than the total sugar solids content of the casing dough, based upon 100 pounds of the flour component of the filler and casing dough, respectively.

Suitable fats and shortening are those conventionally used in the production of cookies or other sweet goods and include: (a) animal fats such as lard, and tallow, (b) hydrogenated animal oils, (c) hydrogenated or unhydrogenated vegetable oils, such as corn oil, peanut oil, coconut oil, palm oil, sunflower oil, safflower oil, and soybean oil. Mixtures of fats or shortenings can also be used. They may be emulsified or stabilized with monoglycerides and di-glycerides, or other known emulsifiers. Commercially available emulsified or stabilized shortenings typically contain from about 2.25% to about 2.75% emulsifier by weight. The shortenings or fats can normally be solid at room temperature or above or liquid vegetable oils can be used. Fats or shortening which melt or become pourable at temperatures of about 85° F. to about 110° F., for example, are suitable for use in compositions of the present invention. In single or multiple dough soft cookies, the shortening may be present in each dough in amounts ranging from about 20 percent to about 80% by weight based upon the weight of flour in the dough.

Each of the doughs may contain up to about 5 percent by weight of a leavening system, based upon the weight of the flour in each dough. The leavening system employed in each dough may be the same or different.

The soft cookies of the present invention should have a pH in the range of from about 6.8 to about 8.5. Use of an unbleached flour generally results in a higher pH than would be obtained with a bleached flour. To achieve a desired pH in the final baked dough, an edible acidifying agent or pH adjusting agent may be incorporated into the doughs of the present invention.

Measurement of the pH of the final baked product and making adjustments in the amount of edible acidifying agent, alkaline agent or type and amount of leavening in the dough to obtain a desired pH is within the ability of one ordinarily skilled in the art. A fast, accurate method particularly suitable for monitoring production runs is to grind the baked final product, suspend it in distilled water to form a 10% by weight slurry, and to make adjustments in the pH adjuster level in the dough based upon the pH of the slurry.

In addition to the foregoing, the doughs used in the process and dough compositions of the invention may include other additives conventionally employed in cookies. Such additives may include, for example, milk by-products, egg or egg by-products, cocoa, vanilla, cereal (oatmeal) as well as inclusions such as nuts, raisins, fruit or dehydrated fruit pieces such as apple or banana, fruit purees, coconut, flavored chips such as chocolate chips, butterscotch chips and caramel chips, and the like.

The doughs of the present invention, including the filler and casing cookie doughs can each be prepared in a conventional manner using a creaming stage and a dough-forming stage. The humectant is conveniently mixed in during the creaming stage of the casing dough preparation. The humectant and at least part of any sucrose which is used are conveniently mixed with the fat or shortening in the creaming stage before the flour and any remaining sucrose are added. The humectants which are in liquid form, such as molasses or high fructose corn syrup, are suitably added with water: (a) after mixing of the dry sugars, shortening or fat, and cold-water swelling granular starch material, and (b) prior to addition of the flour. A portion of the flour may be added in the creaming stage.

The cold water soluble granular starch material may be added in either the creaming or dough forming step. The starch is added in dry or powdered form. It is preferred that the starch be added in the creaming stage so that is has sufficient time to become thoroughly hydrated. It is believed that this also promotes the formation of the starch's water binding gel-like structure. The starch may be pre-blended with the other dry ingredients prior to addition to the creamed mixture.

If flavor chips, or other particulate flavoring ingredients which are intended to substantially maintain their integrity but which tend to smear upon mixing are to be added to either or both cookie doughs: they are preferably added as the last ingredient to the dough with minimal mixing so as to avoid smearing of the flavor chips into the dough.

Mixing is typically performed at ambient temperatures of about 65° F. to about 85° F., preferably 70° F. to 74° F., without external heating. A preferred final dough temperature for optimal machinability ranges from about 72° F. to about 76° F. Suitable mixers include vertical and horizontal mixers, such as conventional bakery-type Hobart mixers. Lay times should preferably be no longer than about one hour.

In the preparation of multi-textured soft cookies, before being combined with the casing dough, the filler dough is preferably cooled to about 60° to about 65° F. (about 15.6° to about 18.3° C.) using carbon dioxide snow to facilitate its transfer through a coextruder or other dough forming device.

The doughs of the present invention are formed into pieces in conventional manner using known bakery equipment such as wire cutting devices, rotary cutters, rotary molders, reciprocating cutters and the like.

In the production of multi-textured cookies, the two cookie doughs may be combined by coextrusion through concentric dies to obtain a coextrudate rope with the filler cookie dough inside and the casing cookie dough outside. The coextrudate rope is cut into pieces using a reciprocating cutter or other cutter which severs the rope and stretches the casing dough to close the end portions of the rope so a to obtain an enrobed dough piece which is bakeable to the cookie of the present invention. Apparatus for forming a composite dough piece in which a center formed of the filler cookie dough is surrounded by or is enrobed by an outer layer formed of the casing cookie dough is described in detail in U.S. Pat. No. 4,528,900 entitled "High Production Apparatus for Forming Filled Edible Products", and in U.S. Pat. No. 4,534,726 entitled "Apparatus Having Shims Underlying Portions of a Die", both in the name of William Simelunas and commonly assigned. These patents are herein incorporated by reference in their entireties.

The composite dough pieces suitably have a weight ratio of the filler dough to the casing dough within the range from about 0.80 to 1.2, approximately equal amounts of each dough being preferred.

The dough pieces are preferably baked in solid band ovens for commercial scale operations. The time and temperature of baking are adjusted in accordance with conventional techniques to provide a moisture content in the baked cookie of 6 percent or more, based upon the weight of the cookie, inclusive of inclusions such as flavor chips. A typical multitextured chocolate chip cookie produced in accordance with the present invention has a moisture content (Brabender 145° C., 12 minutes) of from about 7.6% to about 9.0% by weight, based upon the total weight of the cookie, which includes chocolate chips throughout the cookie.

Moisture contents are determined by first grinding the cookies and then using conventional moisture analysis techniques on the ground sample. Exemplary of such techniques are Brabender (set at 145° C., for 12 minutes) analysis or vacuum oven (set at 70° C. for 24 hours) analysis, with appropriate correlation.

The water activity of the baked cookie should be less than about 0.7, preferably less than or equal to about 0.65, to assure microbial shelf stability.

While baking times and temperatures will vary for different dough formulations, oven types, etc., in general commercial cookie baking times may range from about 5 minutes to about 15 minutes and baking temperatures for cookies may range from about 250° F. (121° C.) to about 500° F. (260° C.).

The cookie dough compositions of the present invention may be used for the production of drop-type cookies, such as chocolate chip cookies, oatmeal cookies, oatmeal raisin cookies, banana walnut cookies, apple raisin cookies, chocolate fudge cookies, peanut butter cookies, sugar cookies, butter cookies, and the like, or sandwich cookies, filled cookies, and multi-textured cookies of extended shelf life.

In the present invention, substantially all of the cookies may: (a) have a maximum diameter preferably within about 7% of a target diameter, and (b) have a stack height for five cookies preferably within about 7% of a target stack height.

The present invention is further illustrated by the following examples, in which all parts, proportions and percentages are by weight and all temperatures are in °F. unless otherwise indicated:

EXAMPLE 1

A dual-textured soft chocolate chip cookie with desirable spread and texture characteristics is prepared by coextruding an inner or filler cookie dough bakeable to a moist, cake-like soft and tender texture with an outer or casing cookie dough bakeable to a firmer and tender texture through a concentric die into a coextrudate rope. The rope is severed with a reciprocating cutter having hemispherically shaped dough forming sections into enrobed dough pieces. The weight of the inner ball of dough is about equal to the weight of the outer dough.

The ingredients and their relative amounts used to prepare the casing dough bakeable to a firm and tender texture were:

| Casing Ingredient | Parts By Weight |
| --- | --- |
| Unbleached Medium Wheat Flour (about 12% water) | 100.0 |
| Chocolate Drops (4200 count) | 60.0 |
| Vegetable Shortening | 50.0 |
| Fine Granulated Sugar (sucrose) | 48.0 |
| Dextrose Monohydrate | 17.4 |
| Lactose (Monohydrate) | 16.3 |
| Soybean Oil | 10.0 |
| Cold Water Swelling Granular Starch Material (Mira-gel TM 463) | 4.5 |
| Sodium Bicarbonate | 2.6 |
| Molasses | 2.5 |
| Dough Salt | 1.6 |
| Spray Dried Whole Eggs | 1.0 |
| Color and Flavor | 0.5 |
| Water | 22.0 |
| TOTAL | 336.4 |

The sugars were all used in their commercially-available forms. The sucrose was fine granulated #1 sugar consisting of essentially 100% sucrose. The dextrose contained 92% solids, essentially 100% of which was dextrose. The lactose contained 98% solids, essentially 100% of which was lactose. The spray dried egg used contained 97% solids, of which 29% was sugar, essentially all sucrose. The molasses contained about 80% solids, of which about 30% was sucrose and about 32% was invert sugar (about 50% dextrose and 50% fructose).

This casing dough was prepared using an upright mixer running at low speed. About one-half of the sucrose, together with the shortening, soy bean oil, cold-water swelling granular starch (Mira-gel TM 463), dextrose, lactose, salt, dried eggs, and flavoring were placed in the mixer and mixed for about 3 minutes to obtain a smooth consistency. The molasses, coloring and water were then added and the mixing continued for about 1 minute. The flour and sodium bicarbonate were added and the mixing continued for about a further 2 minutes. The remaining sucrose was then added and the mixing continued for about a further 2 minutes. Finally, the chocolate chips were added at about 60° F. (15.6° C.) and the mixing was continued for about a further 1 minute to prepare the finished casing dough.

The ingredients and their relative amounts used to prepare the filler dough bakeable to a moist, soft, tender texture were:

| Filling Ingredient | Parts by Weight |
| --- | --- |
| Unbleached Medium Wheat Flour (about 12% water by weight) | 100.0 |
| Chocolate Drops (2000 count) | 91.7 |
| High Fructose Corn Syrup (about 72% solids; 42% fructose, 50% dextrose) | 75.0 |
| Vegetable Shortening | 50.0 |
| Granulated Brown Sugar (about 90% sucrose, 2% invert, 3% water by weight) | 33.3 |
| High Fructose Corn Syrup (about 77% solids; 90% fructose, 7% dextrose, 3% other sugars) | 21.0 |
| Cold Water Swelling Granular Starch Material (Mira-gel TM 463) | 8.5 |
| Nonfat Dry Milk (about 52% lactose) | 4.0 |
| Spray Dried Whole Eggs | 1.5 |
| Dough Salt | 1.5 |
| Sodium Bicarbonate | 1.5 |
| Flavor and Color | 0.4 |
| Ammonium Bicarbonate | 0.2 |
| Water | 23.0 |
| TOTAL | 411.6 |

The filler dough was prepared using the same mixer and low mixing speed as used in preparing the casing dough. The brown sugar, vegetable shortening, cold-water swelling granular starch (Mira-gel TM 463), dried milk, dried eggs, salt, flavoring and a portion of the flour were placed in the mixer and mixed for about 3 minutes. The ammonium bicarbonate was then dissolved in part of the water and added to the mixer, together with the coloring and the remaining water. The mixing was continued for about 2 minutes. The high fructose corn syrups were then added, the mixture cooled with carbon dioxide snow while mixing, and then the mixing was continued to obtain a substantially homogeneous mixture. The remaining flour and the sodium bicarbonate were added and the mixing continued for about a further 3 minutes. The chocolate drops were added, and the mixing continued for about a further 1 minute to produce the finished filler dough with a temperature of about 60° F. to 62° F.

The enrobed cookie preforms, or composite dough pieces, prepared from the casing dough and filler dough were produced continuously and baked to a target end point moisture content of 7.6% to 9.0% by weight, based upon the weight of the cookie, a target pH of 7.0 to 7.8, a target count per pound of 37 to 39 cookies, a target stack height for five pieces of 1 7/8" to 2⅛", and a target diameter of 2" to 2¼". The cookies were packaged in trays which were placed in bags followed by sealing of the bags.

Samples collected over an eight hour production period had a moisture content ranging from 6.9 to 9.2%, based upon the weight of the cookie, with an average moisture content of about 7.7%. The moisture content is determined by grinding a sample of about 12 ounces of cookies into a homogeneous mixture and measuring the moisture content of the mixture on a Brabender moisture analyzer set at 145° C. for 12 minutes. The cookies had a pH ranging from 7.2 to 7.8 with an average pH of about 7.6. The samples had: (a) a count per pound ranging from 37 to 38 cookies, (b) a stack height for five pieces ranging from 1 6/8" to 2", with an average of 1⅞", and (c) a diameter ranging from 2" to 2 ¼", with an average diameter of 2 ⅛". The diameters are measured by taking two measurements substantially perpendicular to each other and then averaging the two measurements.

The cookies were stored in a closed package at room temperature until the moisture in the cookies equilibrated between the inner soft, moist regions and the outer firmer regions of the cookies. The cookie had a soft, tender, non-tough mouthfeel. The inner dough portion possessed a cake-like soft and plastic crumb matrix having a distinctly leavened appearance and the outer dough portion had a firmer, but tender textured crumb structure.

EXAMPLE 2

The ingredients and their relative amounts which may be used to prepare a single dough chocolate chip cookie of the soft variety with desirable spread and texture characteristics are:

| Ingredient | Parts by Weight |
| --- | --- |
| Unbleached Flour | 100.0 |
| Chocolate Drops | 50.0 |
| Vegetable Shortening | 42.0 |
| Sucrose | 25.0 |
| Brown Sugar | 20.0 |
| Butter | 17.0 |
| Salt | 1.5 |
| Humectant Gel | 10.0 |
| Cold Water Swelling Granular Starch Material (Mira-gel TM 463) | 10.0 |
| High Fructose Corn Syrup (about 72% solids; 42% fructose, 50% dextrose, by weight) | 20.0 |
| Honey | 15.0 |
| Molasses | 8.0 |
| Water | 13.0 |
| Sodium Bicarbonate | 1.5 |
| Calcium Phosphate | 0.8 |
| TOTAL | 333.8 |

The humectant gel is a firm, edible gel capable of being ground produced from a blend of: (a) about 100 parts by weight of high fructose corn syrup (about 77% solids, of which about 90% by weight is fructose, about 7% by weight is dextrose and about 3% by weight is other sugars), (b) about 3 parts by weight glycerine, (c) about 1.25 parts by weight sodium alginate gum, (d) 1.25 parts by weight calcium sulfate dihydrate, and (e) about 1 part by weight of propylene glycol. The humectant gel is produced in accordance with Example I of U.S. Pat. No. 4,444,799 which Example is herein incorporated by reference.

The sucrose, brown sugar, vegetable shortening, butter, humectant gel, salt, and granular starch (Mira-gel TM 463) are creamed together in a mixer at low speeds to obtain a substantially homogeneous mixture. The water, high fructose corn syrup, honey, and molasses, are then blended with the other ingredients and mixed at low speeds to obtain a substantially homogeneous mixture.

The unbleached flour along with the sodium bicarbonate and the calcium phosphate are dumped into the mixer with the other blended ingredients and mixing is continued to achieve a substantially homogeneous dough. The chocolate drops are added to the dough with minimal mixing to distribute them substantially uniformly throughout the dough without substantial destruction of the integrity of the particles.

The dough may be formed into pieces using a wire cutting device and baked in a solid band oven, having top and bottom burners at temperatures ranging from about 190 degrees F. to about 600 degrees F. to obtain cookies having: (a) a moisture content of from about 6.0 to about 8.0% by weight, (b) a diameter of 2 ¼"±⅛", (c) a thickness of 2"±⅛" per stack of five cookies, and (d) a soft, moist and tender texture.

EXAMPLE 3

The ingredients and their relative amounts which may be used to prepare a single dough peanut butter chocolate chip cookie of the soft variety with desirable spread and texture characteristics are:

| Ingredient | Parts by Weight |
| --- | --- |
| Unbleached, Medium Wheat Flour | 100.0 |
| Chocolate Drops | 60.0 |
| Vegetable Shortening | 42.0 |
| Sucrose | 72.0 |
| Peanut Butter Drops | 20.0 |
| Peanut Butter | 65.0 |
| Salt | 1.5 |
| Humectant Gel of Example 2 | 14.0 |
| Cold Water Swelling Granular Starch Material (Mira-gel TM 463) | 5.0 |
| High Fructose Corn Syrup (about 77% solids; 90% fructose, 7% dextrose, 3% other sugars) | 15.0 |
| Honey | 4.0 |
| Dextrose | 2.0 |
| Water | 36.0 |
| Leavening | 2.5 |
| Peanut Flour (unbleached) | 10.0 |
| Minor Ingredients (whey, spray dried eggs, and flavor) | 7.0 |
| TOTAL | 457.0 |

The sucrose, vegetable shortening, dextrose, corn syrup, honey, peanut butter, humectant gel, salt, granular starch (Mira-gel TM 463) peanut flour, and minor ingredients are creamed together in a mixer at low speeds to obtain a substantially homogeneous mixture. The water, leavening, and unbleached flour are added to the mixer are then blended with the other ingredients at low speeds to obtain a substantially homogeneous mixture. The chocolate drops and peanut butter drops are added to the dough with minimal mixing to distribute them substantially uniformly throughout the dough without substantial destruction of the integrity of the particles.

The dough may be formed into pieces using a wire cutting device and baked in a solid band oven, having top and bottom burners at temperatures ranging from about 190 degrees F. to about 600 degrees F. to obtain cookies having: (a) a moisture content of from about 8.0 to about 9.0% by weight, (b) a diameter of 2⅛±1/16",

15

(c) a thickness of 2¼"±1/16" per stack of five cookies, and (d) a soft, moist and tender texture.

EXAMPLE 4

The ingredients and their relative amounts which may be used to prepare a single dough oatmeal raisin cookie of the soft variety with desirable spread and texture characteristics are:

| Ingredient | Parts By Weight |
| --- | --- |
| Unbleaached Medium Wheat Flour | 100.0 |
| Rolled Oats | 50.0 |
| Vegetable Shortening | 63.0 |
| Sucrose | 36.0 |
| Brown Sugar | 30.0 |
| Raisin Paste | 42.0 |
| Salt | 2.0 |
| Humectant Gel of Example 2 | 14.0 |
| Cold Water Swelling Granular Starch Material (Mira-gel ™ 463) | 5.0 |
| High Fructose Corn Syrup (about 77% solids; 90% fructose, 7% dextrose, 3% other sugars) | 28.5 |
| Raisins | 18.0 |
| Molasses | 14.0 |
| Water | 20.0 |
| Sodium Bicarbonate | 2.0 |
| Minor Ingredients | 3.5 |
| TOTAL | 429.0 |

The sucrose, brown sugar, vegetable shortening, raisin paste, raisins, humectant gel, salt, granular starch (Mira-gel ™ 463), corn syrup, molasses, and minor ingredients are creamed together in a mixer at low speeds to obtain a substantially homogeneous mixture. The water and rolled oats are then blended with the other ingredients and mixed at low speeds to obtain a substantially homogeneous mixture.

The unbleached flour along with the sodium bicarbonate are dumped into the mixer with the other blended ingredients and mixing is continued to achieve a substantially homogeneous dough.

The dough may be formed into pieces using a wire cutting device and baked in a solid band oven, having top and bottom burners at temperatures ranging from about 190 degrees F. to about 600 degrees F. to obtain cookies having: (a) a moisture content of from about 8.0 to about 9.0% by weight (b) a diameter of 2 1/16"±1/16", (c) a thickness of 2 5/16"±1/16"per stack of five cookies, and (d) a soft, moist and tender texture.

What is claimed is:

1. A method for controlling spread in soft cookies having an extended shelf life comprising:
   (a) forming a dough by admixing unbleached flour, a humectant for imparting softness to the cookies for at least two months when the cookie is packaged in a closed container, water, shortening or fat, and from about 2% by weight to about 20% by weight of a cold-water swelling granular starch material having a cold water solubility of at least 50%,
   (b) forming the dough into pieces, and
   (c) baking the dough pieces to a moisture content of at least 6% by weight and a water activity of less than about 0.7,
the weight percent of said granular starch material being based upon the weight of the unbleached flour, said starch material serving to reduce cookie spread.

2. A method as claimed in claim 1 wherein the granular starch material has a cold-water solubility of at least 70%.

3. A method as claimed in claim 1 wherein the granular starch material is derived from ungelatinized corn starch and consists essentially of substantially intact, partially swollen granules which appear nonbirefringent when viewed under a polarizing microscope.

4. A method as claimed in claim 1 wherein the flour content of the dough is from about 25% by weight to about 50% by weight, based upon the weight of the dough, exclusive of inclusions.

5. A method as claimed in claim 4 wherein substantially all of the flour in the dough is unbleached.

6. A method as claimed in claim 4 wherein the unbleached flour has a pH of about 6.5 to about 6.8.

7. A method as claimed in claim 4 wherein the flour used in producing the dough has a pH of at least 6.

8. A method as claimed in claim 7 wherein the flour used in producing the dough is a mixture of flours.

9. A method as claimed in claim wherein the dough of step (a) is a filler dough which is coextruded with a casing dough to form a coextrudate, and the coextrudate is formed into pieces.

10. A method as claimed in claim 9 wherein said casing dough comprises unbleached flour, a humectant, water, shortening or fat, and from about 2% by weight to about 20% by weight of a cold-water swelling granular starch material having a cold water solubility of at least 50%, and said coextrudate pieces are baked to a moisture content of at least 6% by weight to obtain soft cookies having a moist, soft and tender textured crumb structure in the portion baked from said filler dough, and a soft and tender but firmer textured crumb structure in the portion baked from said casing dough, the plurality of textures being shelf stable for at least two months when the cookies are packaged in a closed container.

11. A method as claimed in claim 10 wherein the coextruded dough pieces are baked to a moisture content of from about 7% to about 10% by weight.

12. A method as claimed in claim 1 wherein said granular starch material is admixed with the shortening or fat prior to addition of the flour.

13. A dough composition for producing a soft cookie, said dough composition comprising an unbleached flour, a humectant, shortening or fat, and a cold water swelling granular starch material having a cold water solubility of at least 50% in an amount of from about 0.5% by weight to about 10% by weight, based upon the weight of the dough, exclusive of inclusions.

14. A dough composition as claimed in claim 13 wherein the amount of the cold-water swelling granular starch material is from about 1% to about 6% by weight.

15. A dough composition as claimed in claim 13 wherein the unbleached flour comprises unbleached wheat flour.

16. A dough composition as claimed in claim 13 wherein the flour content of the dough is from about 25% by weight to about 50% by weight, based upon the weight of the dough, exclusive of inclusions.

17. A dough composition as claimed in claim 16 wherein substantially all of the flour in the dough is unbleached.

18. A dough composition as claimed in claim 17 wherein the unbleached flour has a pH of about 6.5 to about 6.8, and the moisture content of the dough is from about 10% by weight to about 25% by weight, based upon the weight of the dough exclusive of inclusions.

19. A baked, soft cookie comprising:
(a) a first portion having a soft, moist and tender textured crumb structure baked from a cookie dough comprising unbleached flour, shortening or fat, a humectant for imparting softness to the first portion, and a cold-water swelling granular starch material having a cold water solubility of at least 50%,
(b) a second soft and tender crumb portion having a firmer textured crumb structure than said first portion and said second portion being laminated to said first portion, wherein said second portion is baked from a cookie dough comprising flour, shortening or fat, and a humectant,
the amount of said granular starch material being from about 2% by weight to about 20% by weight based upon the weight of the unbleached flour in the dough bakeable to said first portion, the moisture content of said cookie being at least 6% by weight.

20. A soft cookie as claimed in claim 19 wherein the flour of the dough bakeable to said second portion comprises unbleached flour, and the dough bakeable to said second portion further comprises said granular starch material in an amount of from about 2% by weight to about 20% by weight based upon the weight of the unbleached flour in the dough bakeable to said second portion.

21. A soft cookie as claimed in claim 20 wherein the sucrose content of each dough is less than 75% by weight, based upon the total sugar solids content of each dough, the humectant of the dough bakeable to said first portion comprises a high fructose corn syrup, and the humectant of the dough bakeable to said second portion comprises at least one member selected from the group consisting of lactose and dextrose.

* * * * *